(12) United States Patent
Fan et al.

(10) Patent No.: US 11,348,336 B2
(45) Date of Patent: May 31, 2022

(54) SYSTEMS AND APPROACHES FOR LEARNING EFFICIENT REPRESENTATIONS FOR VIDEO UNDERSTANDING

(71) Applicant: International Business Machines Corporation, Armonk, NY (US)

(72) Inventors: Quanfu Fan, Lexington, MA (US); Richard Chen, Mount Kisco, NY (US); Sijia Liu, Somerville, MA (US); Hildegard Kuehne, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 15/931,075

(22) Filed: May 13, 2020

(65) Prior Publication Data

US 2021/0357651 A1 Nov. 18, 2021

(51) Int. Cl.
*G06V 20/00* (2022.01)
*G06V 20/40* (2022.01)
*G06F 17/16* (2006.01)
*G06N 3/04* (2006.01)

(52) U.S. Cl.
CPC .............. *G06V 20/46* (2022.01); *G06F 17/16* (2013.01); *G06N 3/0454* (2013.01)

(58) Field of Classification Search
CPC ....... G06V 20/46; G06F 17/16; G06N 3/0454
See application file for complete search history.

(56) References Cited

U.S. PATENT DOCUMENTS

| 10,366,292 B2 | 7/2019 | Min et al. |
| 2018/0139458 A1 | 5/2018 | Wang et al. |
| 2019/0019037 A1 | 1/2019 | Kadav et al. |
| 2019/0124346 A1 | 4/2019 | Ren et al. |

(Continued)

FOREIGN PATENT DOCUMENTS

WO 2019099226 5/2019

OTHER PUBLICATIONS

Ng et al., "Temporal Difference Networks for Video Action Recognition", University of Maryland. IEEE Winter Conference on Applications of Computer Vision Mar. 12, 2018 1018.

(Continued)

*Primary Examiner* — Fayyaz Alam
(74) *Attorney, Agent, or Firm* — Fleit Intellectual Property Law; Jeffrey N. Giunta

(57) ABSTRACT

Systems and methods for performing video understanding and analysis. Sets of feature maps for high resolution images and low resolution images in a time sequence of images are combined into combined sets of feature maps each having N feature maps. A time sequence of temporally aggregated sets of feature maps is created for each combined set of feature maps by: selecting a selected combined set of feature maps corresponding to an image at time "t" in the time sequence of images; applying, by channel-wise multiplication, a feature map weighting vector to a number of combined sets of feature maps that are temporally adjacent to the selected combined set of feature maps; and summing elements of the number of combined set of feature maps into a temporally aggregated set of feature maps. The time sequence of temporally aggregated sets of feature maps is processed to perform video understanding processing.

20 Claims, 7 Drawing Sheets

(56) References Cited

U.S. PATENT DOCUMENTS

2019/0164020 A1    5/2019  Sabripour
2020/0364870 A1*  11/2020  Lee .......................... G06T 7/10
2021/0350168 A1*  11/2021  Tian ...................... G06V 10/40

OTHER PUBLICATIONS

Chun-Fu Chen et al., "Big-Little Net: An Efficient Multi-Scale Feature Representation for Visual and Speech Recognition", ICLR, Jul. 2019.

Du Tran et al., Learning Spatiotemporal Features With 3D Convolutional Networks. In The IEEE International Conference on Computer Vision (ICCV), Dec. 2015.

Joao Carreira et al., Quo vadis, action recognition? a new model and the kinetics dataset. In proceedings of the IEEE Conference on Computer Vision and Pattern Recognition, pp. 6299-6308, 2017, Feb. 12, 2018.

Du Tran et al., A closer look at spatiotemporal convolutions for action recognition. In Proceedings of the IEEE conference on Computer Vision and Pattern Recognition, pp. 6450-6459, 2018, Apr. 12, 2018.

Christoph Feichtenhofer et al., Slowfast networks for video recognition. 2018, arXiv preprint arXiv:1812.03982, Oct. 29, 2019.

Noureldien Hussein et al., Timeception for Complex Action Recognition. CVPR 2019, arXiv preprint arXiv:1812.01289V2, Apr. 28, 2019.

Saining Xie et al., "Rethinking Spatiotemporal Feature Learning: Speed-Accuracy Trade-offs in Video Classification." arXiv preprint arXiv:1712.04851v2, Jul. 27, 2018.

* cited by examiner

SYSTEMS AND APPROACHES FOR LEARNING EFFICIENT REPRESENTATIONS FOR VIDEO UNDERSTANDING

BACKGROUND

The present disclosure generally relates to the field of machine learning and more particularly to the field of processing time sequences of images to perform video understanding and analysis.

Video understanding, which includes processing to support action/activity recognition and detection as well as other applications involving spatiotemporal analysis in video via machine learning techniques is generally quite resource intensive. In an example, videos are processed as a time sequence of two-dimensional images. Machine learning to process and characterize spatiotemporal representations of video processes such sequential image data over three-dimensions, the two special dimensions of each image as well as in the time dimension, which is the third dimension to be processed. The resource requirements for performing such machine learning processing, including the resources used for training models to perform such processing, is often large particularly when the processing to perform video understanding, such as to perform motion detection, is used to process fairly long portions of the video and thus processes many frames of a video to perform video understanding processing.

BRIEF SUMMARY

In one example, a method for supporting video understanding processing of a time sequence of images includes combining, into a time sequence of combined sets of feature maps, a respective set of high resolution feature maps for each respective image in a time sequence of high resolution set of images with a respective set of low resolution feature maps for respective corresponding images in a time sequence of low resolution set of images. Each combined sets of feature maps comprises N feature maps. The method further includes creating a time sequence of temporally aggregated sets of feature maps by, for each combined set of feature maps in the time sequence of combined sets of feature maps: selecting a selected combined set of feature maps ($y_t$) corresponding to an image at time "t" in the time sequence of images; applying, by channel-wise multiplication, a respective feature map weighting vector ($w_j$) of dimension 1×1×N to a number (R) of combined set of feature maps that are temporally adjacent to the selected combined set of feature maps ($y_t$); and summing corresponding elements of the number (R) of combined set of feature maps into a temporally aggregated set of feature maps comprising a plurality of feature maps that each comprise a respective plurality of values. The method also includes processing the time sequence of temporally aggregated sets of feature maps to perform video understanding and analysis.

In another example, an apparatus for supporting video understanding processing of a time sequence of images includes a processor, a memory coupled to the processor, and a combiner. The combiner, when operating, is configured to combine, into a time sequence of combined sets of feature maps, a respective set of high resolution feature maps for each respective image in a time sequence of high resolution set of images with a respective set of low resolution feature maps for respective corresponding images in a time sequence of low resolution set of images. Each combined sets of feature maps comprises N feature maps. The apparatus further includes a Temporal Aggregation Module, when operating, is configured to create a time sequence of temporally aggregated sets of feature maps by at least, for each combined set of feature maps in the time sequence of combined sets of feature maps: selecting a selected combined set of feature maps ($y_t$) corresponding to an image at time "t" in the time sequence of images; applying, by channel-wise multiplication, a respective feature map weighting vector ($w_j$) of dimension 1×1×N to a number (R) of combined set of feature maps that are temporally adjacent to the selected combined set of feature maps ($y_t$); and summing corresponding elements of the number (R) of combined set of feature maps into a temporally aggregated sets of feature maps comprising a plurality of feature maps that each comprise a respective plurality of values. The apparatus also includes a video understanding module, that when operating, is configures to process the time sequence of temporally aggregated sets of feature maps to perform video understanding and analysis.

In yet another example, a computer program product for supporting video understanding processing of a time sequence of images the computer program product includes a storage medium readable by a processing circuit and storing instructions for execution by the processing circuit for performing a method that includes the following. A respective set of high resolution feature maps for each respective image in a time sequence of high resolution set of images with a respective set of low resolution feature maps for respective corresponding images in a time sequence of low resolution set of images are combined into a time sequence of combined sets of feature maps. Each combined sets of feature maps comprises N feature maps. A time sequence of temporally aggregated sets of feature maps is created by, for each combined set of feature maps in the time sequence of combined sets of feature maps: selecting a selected combined set of feature maps ($y_t$) corresponding to an image at time "t" in the time sequence of images; applying, by channel-wise multiplication, a respective feature map weighting vector ($w_j$) of dimension 1×1×N to a number (R) of combined set of feature maps that are temporally adjacent to the selected combined set of feature maps ($y_t$); and summing corresponding elements of the number (R) of combined set of feature maps into a temporally aggregated sets of feature maps comprising a plurality of feature maps that each comprise a respective plurality of values. The time sequence of temporally aggregated sets of feature maps is processed to perform video understanding and analysis.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various examples and to explain various principles and advantages all in accordance with the present disclosure, in which.

DETAILED DESCRIPTION

Figure 1:
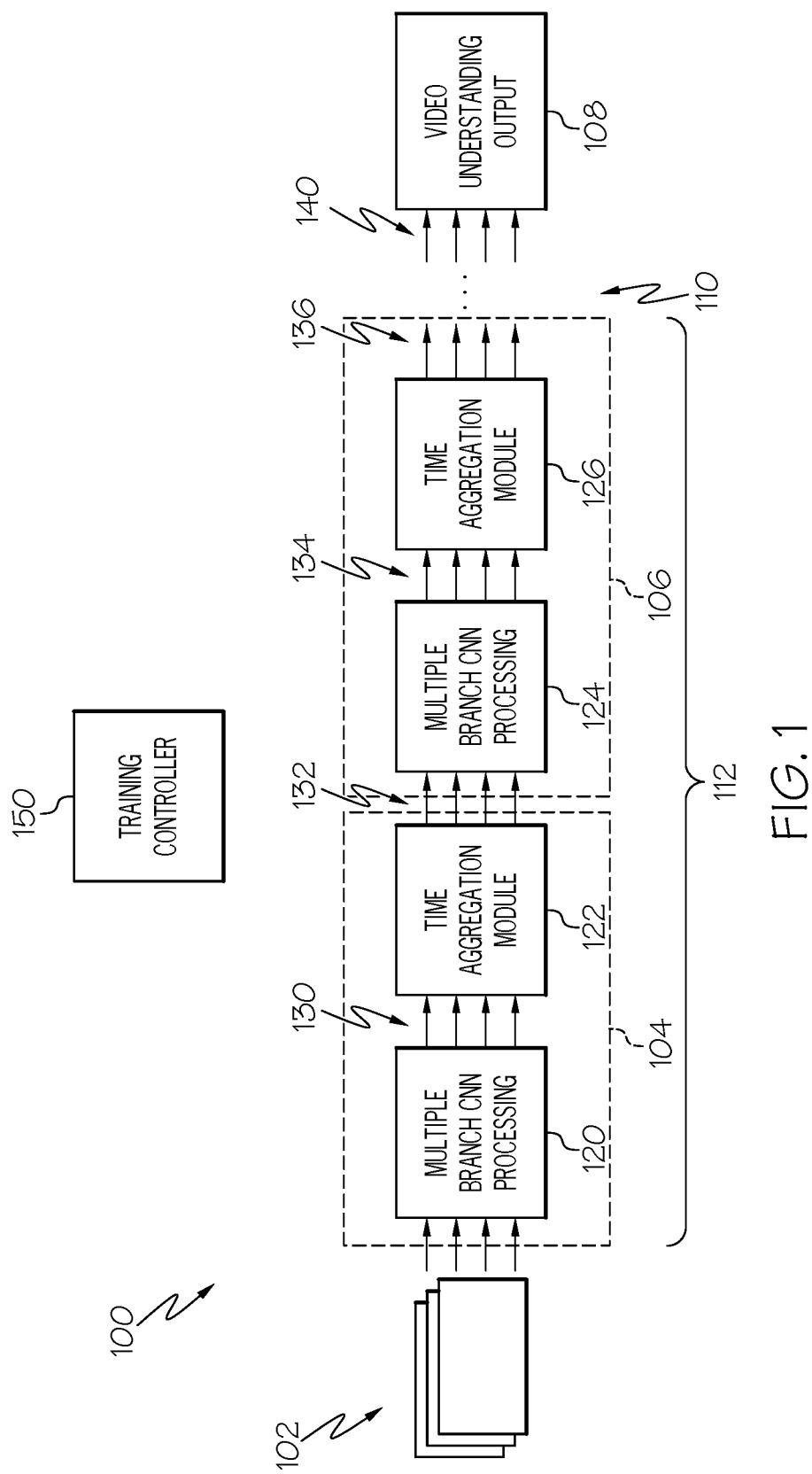
FIG. 1 illustrates an example video understanding system, in accordance with one example.

The following description presents example systems and methods that implement architectures that have exhibit reduced processing and memory usage to process videos in order to perform video understanding processing, such as action recognition. These architectures, in an example, are based on processing of different images of a video stream by machine learning algorithms that include multiple processing branches that each has its own Convolutional Neural Network configuration.

In an example, an original video stream, which is a time sequence of two-dimensional images or video frames, is split into multiple sub-streams of video frames. These multiple sub-streams of video frames are processed in an example by a multiple branch Convolutional Neural Network (CNN) where each branch processes a different sub-stream of video frames that are contained in the original video stream. In some examples, the multiple branch Convolutional Neural Network (CNN) is a two branch, 2-dimensional Convolutional Neural Network (CNN) where each branch contains a separate 2-dimensional Convolutional Network with different designs that each processes one sub-stream of video frames within two sub-streams that are created from an original video stream that is a time sequence of video frames.

In some examples, the original video stream is split into two sub-streams that are a high resolution sub-stream and a low resolution sub-stream. In an example, the low resolution sub-stream contains a subset of images contained in the original video stream where that subset of images is created by reducing the resolution of every other image in the original video stream. The high resolution sub-stream in that example contains another subset of images contained in the original video stream where that subset of images is created by copying other images in the original video stream at their original resolution or in some examples with a changed resolution that is higher than that of the resolution of the images in the low resolution sub-stream. In an example, the high resolution sub-stream of images includes even numbered images of an original video stream, and the low resolution sub-stream of images includes reduced resolution copies of the odd numbered images of the original video stream. In further examples, any number of video sub-streams of images is able to be created from an original video stream. In some examples, each sub-stream of images is processed by a different Convolutional Neural Network sub-network. These different sub-streams of images are able to have any desired characteristics, such as having different resolutions, different frame rate sampling intervals of the original video stream, other characteristics, or combinations of these. In some examples, each of the different sub-streams is able to contain representations of different video frames that are contained in the original video stream, which is to say that the two sub-streams of images each contain representations of the different video frame in the original video stream. In other examples, two or more sub-streams are able to include at least some representations of the same video frame from the original video stream, but where each such representation has the different characteristics that are associated with its respective sub-stream of images.

In an example, the time sequence of high resolution images is processed using a first branch of the multiple branch, 2-dimensional Convolutional Neural Network (CNN), and the time sequence of low resolution images is processed by a second branch of the multiple branch, 2-dimensional Convolutional Neural Network (CNN). The first branch of the multiple branch, 2-dimensional Convolutional Neural Network (CNN) has a compact subnet, and the second branch of the multiple branch, 2-dimensional Convolutional Neural Network (CNN) has a deep subnet. The feature maps produced by these two branches of the multiple branch, 2-dimensional Convolutional Neural Network (CNN) are combined for further processing, such as by higher layers of a deep learning neural network. Such parallel processing is able to yield both high efficiency and prediction accuracy. Experiments have indicated that this architecture is able to reduce processing resource and memory requirements relative to conventional approaches. The utilization of such architectures enables training deeper models to process some images while processing more input frames overall while also maintaining similar computational budget.

The below examples are also able to further obviate the use of large-scale 3D convolutions to identify temporal dependencies by including a Temporal Aggregation Module (TAM) to model temporal dependencies in the video stream at relatively low additional computational costs. The TAM in an example generates feature maps to be processed by higher layers of deep neural networks by combining feature maps of a set of temporally adjacent images that have been produced by a lower layers of the deep neural network. In an example, including Temporal Aggregation Modules into one or multiple layers of a deep neural network allows temporal information over a larger number of images in the video stream to be processed by the higher layers of the deep neural network.

The below description uses an example that includes a multiple branch, 2-dimensional Convolutional Neural Network (CNN). It is also to be understood that that the principles and architectures described below are able to be easily expanded to the use of multiple branch, 3-dimensional Convolutional Neural Networks to process the multiple sub-streams of video frames created from an original video stream. In such a further example, an original video stream is able to be divided into two sub-streams and each sub-stream is processed by a separate branch of a two branch, 3-dimensional Convolutional Neural Network (CNN), where each branch consists of a separate sub-network of 3-dimensional Convolutional Neural Network (CNN) that have different complexities in order to efficiently process the different resolutions of images contained in the respective sub-stream of video frames that it processes.

FIG. 1 illustrates an example video understanding system 100, in accordance with one example. The example video understanding system 100 receives a video stream, which is a time sequence of images 102. Each of the images in the time sequence of images 102 in this example is a video frame.

Each of the images in the time sequence of images 102 is provided to a first layer 104 of a deep neural network 112. In the illustrated example, the first layer 104 includes a first multiple branch Convolutional Neural Network (CNN) 120 that is followed by a first Temporal Aggregation Module (TAM) 122. The first multiple branch CNN 120, an example of which is described in further detail below, produces a first set of feature maps 130. The first set of feature maps 130 in an example includes a set of feature maps for each image in the received time sequence of images 102. In general, the first multiple branch CNN 120 has a number of separate branches that each has a different Convolutional Neural Network (CNN) to process at least part of the time sequence of images 102 and operates to produce a particular number of different feature maps that that are associated with different kernels used in the first multiple branch CNN 120. As such, the first set of feature maps 130 includes a number of three-dimensional sets of data that each corresponds to a respective image in the time sequence of images 102. Each image in the time sequence of images 102 therefore has a number of corresponding feature maps that are part of the first set of feature maps 130.

The first TAM 122 receives the first set of feature maps 130 and produces a first set of time aggregated feature maps 132. As described in further detail below, the first TAM 122 determines values in the first set of time aggregated feature maps 132 that are based on weighted combinations of feature maps that are associated with several temporally adjacent images in the time sequence of images 102.

The first set of time aggregated feature maps 132 is provided to a second layer 106 of a deep neural network. The second layer 106 of a deep neural network includes a second multiple branch CNN 124 and a second TAM 126. The second multiple branch CNN 124 is similar to the first multiple branch CNN 120 in that it has multiple branches with different Convolutional Neural Network architectures to process at least part of the feature maps in the first set of time aggregated feature maps. The second multiple branch CNN 124 operates on the first set of time aggregated feature maps 132 to produce a second set of feature maps 134. In this example, because the first set of time aggregated feature maps includes information concerning several time adjacent images, the second multiple branch CNN 124 processes input values that include information regarding temporal changes in adjacent images and thus the second set of feature maps 134 is further based on that temporal information.

The second TAM 126 processes the second set of feature maps 134 and produces a third set of time aggregated feature maps 136. The second TAM 126 aggregates information that is in several adjacent sets feature maps in the second set of feature maps 134. The second TAM 126 determines values in the second set of time aggregated feature maps 136 based on weighted combinations of several sets of adjacent feature maps in the second set of feature maps 134 that are produced by the second multiple branch CNN 124. Because each set of feature maps in the second set of feature maps 134 produced by the second multiple branch CNN 124 is based on temporal information that was incorporated by the first TAM 122 into the first set of time aggregated feature maps 132, the second TAM 126 produces a second set of time aggregated feature maps 136 that are based on weighted combinations of feature maps that include even more temporal information from over a larger sequence of adjacent images in the time sequence of images 102.

The deep neural network 112 in an example further includes at least one higher layers 110. In various examples, these higher layers 110 are able to have any suitable design, including designs similar to the first layer 104 and the second layer 106.

The deep neural network 112 in an example produces output values 140 that are used to produce a video understanding output 108. In various examples, the video understanding output 108 includes producing outputs related to video action recognition that are produced by processing output values 140 in order to produce outputs that indicate a likely actions that are identified in the time sequence of images 102. Such processing of neural network activations to produce characterizations is understood by practitioners of ordinary skill in the relevant arts in light of the present discussion.

In some conventional systems, Convolutional Neural Networks that perform video understanding and analysis identify characteristics such as motion in sequences of images by including three-dimensional Convolutional Neural Networks that have a large number of parameters that have to be determined by training of the neural networks. In examples of the example video understanding system 100, the first layer 104 and the second layer 106 include two-dimensional Convolutional Neural Network elements that generally have fewer parameters than three-dimensional Convolutional Neural Networks and thus require fewer computing resources.

The Temporal Aggregation Modules in the first layer 104 and the second layer 106 include weighting values for their various Convolutional Neural Networks and Temporal Aggregation Modules that are determined and refined by processing training images in a manner similar to training conventional convolutional neural networks. In the example video understanding system 100, a training controller 150 performs processing to support the processing of training images for the determination and refinement of parameters of the various Convolutional Neural Networks and the various Temporal Aggregation Modules within the example video understanding system 100. In various examples, any suitable type of training images and processing to determine and refine model parameters is able to be incorporated based on the objectives of a particular application. Determining or selecting such training images and processing to determine model parameters are understood by practitioners of ordinary skill in the relevant arts in light of the present discussion.

Figure 2:
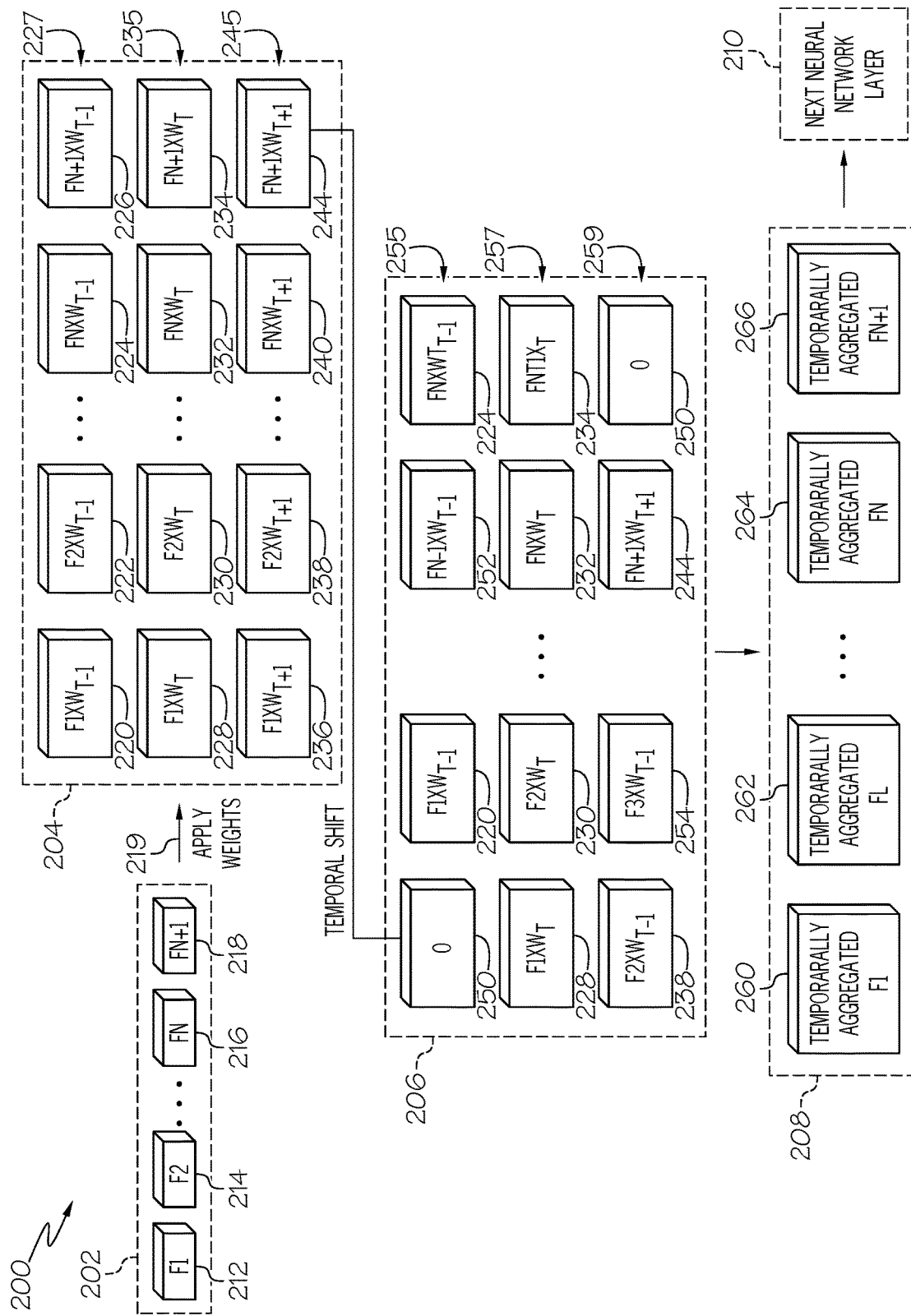
FIG. 2 illustrates an example Temporal Aggregation Module (TAM), according to an example.

FIG. 2 illustrates processing of a Temporal Aggregation Module (TAM) 200, according to an example. With reference to the example video understanding system 100 discussed above, the processing of the Temporal Aggregation Module (TAM) 200 depicts processing such as is performed by the first Temporal Aggregation Module 122 or the second Temporal Aggregation Module 126. In an example, the Temporal Aggregation Module 122 receives sets of feature maps that are associated with images in a time sequence of images and aggregates features that have been detected in temporally adjacent images to efficiently produce sets of feature maps that also include temporal information. In an example, subsequent layers of a neural network are able to more efficiently process temporal aspects of the time sequence of images and process such sets of feature maps using less computationally complex layers that are conventionally used for recognition of temporal aspects such as activity recognition or other aspects of video understanding.

The processing of the Temporal Aggregation Module 200 in an example processes each set of feature maps that is associated with each image in the above described time sequence of images 102 and operates to produce temporally aggregated sets of feature maps 132 that that aggregate together values in sets of feature maps of temporally adjacent images. In the illustrated example, values of sets of feature maps that have been determined for a few images that are temporally adjacent to each other are each multiplied by weighting values and are then added together to produce temporally aggregated sets of feature maps. In various examples, adjusting those weighting values, the kernels used in two-dimensional Convolutional Neural Network, or both, is able to yield efficient characterizations of spatio-temporal representations in the sequence of images 102.

The processing of a Temporal Aggregation Module (TAM) 200 depicts processing that accepts an input time sequence of sets of feature maps 202 and produces a time sequence of temporally aggregated sets of feature maps 208. The input time sequence of sets of feature maps 202 is similar to the first set of feature maps 130, discussed above, and includes a three-dimensional set of data that corresponds to each image in a time sequence of images, where one dimension contains different feature maps for its corresponding image. In general, each feature map in the input time sequence of feature maps 202 can be thought of as being associated with a particular video frame or image in an input time sequence of images that is being processed by video understanding processes.

The illustrated input time sequence of sets of feature maps 202 depicts four example sets of feature maps, a first set of feature maps F1 212, a second set of feature maps F2 214, an $n^{th}$ set of feature maps FN 416, and an $(N+1)^{th}$ set of feature maps FN+1 218. The depicted input time sequence of sets of feature maps 202 shows a first two set of feature maps, F1 212 and F2 214, and a last two set of feature maps FN 216 and FN+1 218, that are present when processing a time sequence of images. In the following discussion, each set of feature maps are referred to as being associated with a particular time, such as time "t." For example, the first set of feature maps F1 212 is associated with time t=1, the second set of feature maps F2 214 is associated with time t=2, the nth set of feature maps FN 416 is associated with time t=N, and so forth. The depicted input time sequence of sets of feature maps 202 depicts four sets of feature maps in order to more concisely describe the relevant aspects of the present examples. Ellipses between F2 214 and FN 216 indicate a number of sets of feature maps that are present between those two sets an in practice a Temporal Aggregation Module is able to process any number of sets of feature maps. In general, a time sequence of images processed by the systems and methods described herein are able to contain any number of images.

The processing of the Temporal Aggregation Module (TAM) 200 in an example creates a time sequence of temporally aggregated sets of feature maps 208. The created time sequence of temporally aggregated sets of feature maps 208 in an example includes a respective set of feature maps that corresponds to each image in time sequence of images 102, where those feature maps include temporal information regarding motion within adjacent images in the time sequence of images 102 in order to support video understanding processing such as action recognition. In order to incorporate temporal information into the feature maps created by the Temporal Aggregation Module (TAM) 200, a weighted sum of values in each set of feature maps in the input time sequence of sets of feature maps 202 is created by adding, to a weighted copy of each set of feature maps, weighted values of sets of feature maps that are temporally adjacent to that set of feature maps. The time sequence of temporally aggregated sets of feature maps 208 are then able to be processed by subsequent layers of a deep neural network to identify or characterize spatio-temporal features in those images.

The processing of the Temporal Aggregation Module (TAM) 200 in an example creates a weighted input time sequence of sets of feature maps 204 by creating a number of copies of the input time sequence of sets of feature maps 202 and multiplying each value in those copies by determined weighting values. In an example, the weighting values are determined by processing of training images according to machine learning training techniques as is understood by practitioners of ordinary skill in the relevant arts in light of the present discussion.

The illustrated weighted input time sequences of sets of feature maps 204 includes a first weighted copy 227, a second weighted copy 235 and a third weighted copy 245. The number of copies in an example corresponds to the number of sets of feature maps that are aggregated together to create the temporally aggregated sets of feature maps in the time sequence of temporally aggregated sets of feature maps 208. In the following description, "R" indicates the number of adjacent sets of feature maps that are aggregated into each time aggregated feature map. The depicted weighted input time sequences of sets of feature maps 204 has R equal to three (3) because there are three copies of the input time sequence of sets of feature maps. In general, R is able to be any number up to the total number of input frames.

In the depicted weighted input time sequences of sets of feature maps 204, each set of feature maps that is associated with each image contains N channels, or feature maps, where each channel is arranged as a feature map with one element that corresponds to one or a number of elements, such as pixels, of input images being processed. In creating the weighted input time sequences of sets of feature maps 204, each copy of the input time sequence of sets of feature maps 202 is multiplied by a different set of weights. In the illustrated example, R is three and three sets of weighting values used to create the weighted input time sequences of sets of feature maps 204. These three sets of weighting values include: 1) a first set of weighting values ($w_{t-1}$) to be applied when creating the first weighted copy 227; 2) a second set of weighting values ($w_t$) to be applied when creating the second weighted copy 235; and 3) a third set of weighting values ($w_{t+1}$) to be applied when creating the third weighted copy 345. In general, when sets of feature maps are aggregated over R time intervals, there are R sets of weighting values that are generally applied to sets of feature maps that are associated with times that precede and succeed the time associated with the time aggregated set of feature maps being calculated.

The weighted input time sequences of sets of feature maps 204 includes a first weighted copy 227 that includes sets of feature maps F1×$w_{t-1}$ 220, F2×$w_{t-1}$ 222, FN×$w_{t-1}$ 224 and FN+1×$w_{t-1}$ 226. This first weighted copy 227 is multiplied by the first set of weights $w_{t-1}$. In an example, each set of weighting factors is defined as a 1×1×N vector where each value in an Nth feature map in the set of feature maps is multiplied by the value in the N dimension of the 1×1×N vector. Such multiplication is indicated by the "×" operator and is referred to as channel-wise multiplication. For a set of N feature maps F, channel-wise multiplication by a 1×1×N weighting vector "w" by the "×" operator is defined as:

$$F \times w = [(w_1 * F_1)(w_2 * F_2) \ldots (w_n * F_n)]$$

Where:

$F$=a set of feature maps=$[F_1 F_2 \ldots F_n]$

Where each $F_i$ is a 2 dimensional feature map $w$=1×1×$N$ vector with scalar elements $w_i$=$[w_1 w_2 \ldots w_n]$ The weighted input time sequences of sets of feature maps 204 also includes a second weighted copy 235 that includes F1×w$_t$ 228, F2×w$_t$ 230, FN×w$_t$ 232 and FN+1×w$_t$ 234, and a third weighted copy 245 that includes F1×w$_{t+1}$ 236, F2×w$_{t+1}$ 238, FN×w$_{t+1}$ 240 and FN+1×w$_{t+1}$ 244.

The processing of a Temporal Aggregation Module (TAM) 200 in an example then creates a time shifted set of copies of input time sequences of sets of feature maps 206 by performing temporal shifting of the copies in the weighted input time sequences of sets of feature maps 204. The temporal shifting in an example supplies "Null" sets of feature maps to fill voids when shifting at the end of the input time sequence of sets of feature maps 202. Although not shown for the weighted input time sequences of sets of feature maps 204, a FN−1×w$_{t-1}$ 252 is shown as a copied weighed set of feature maps that precedes the FN×w$_{t-1}$ 224 in the first weighted copy 227. Similarly, a F3×w$_{t+1}$ 254 is shown as a copied weighed set of feature maps that follows the F2×w$_{t+1}$ 238 in the third weighted copy 245. The first weighted copy 227 in this example is shifted by one place to the right to create the first shifted weighted copy 255. A Null set of feature maps 250 is placed in the first position, while the F1×w$_{t-1}$ 220, F2×w$_{t-1}$ 222, FN×w$_{t-1}$ 224 of the first weighted copy 227 are all shifted to the right by one position, which corresponds to shifting those sets of feature maps by one time slot relative to the second weighted copy 235. The second shifted weighted copy 255 in this example includes the unchanged second weighted copy 235, which includes F1×w$_t$ 228, F2×w$_t$ 230, FN×w$_t$ 232 and FN+1×w$_t$ 234. The third shifted weighted copy 259 is shifted to the left one by one place, which corresponds to shifting the feature maps of the third weighted copy 245 by one time slot relative to the second shifted weighted copy 257 in the opposite direction as the first shifted weighted copy 255 was shifted. In examples where more than three copies are made, the additional copies are shifted by proportional amounts. For example, if another pair of copies is created in addition to those described above, one is multiplied by w$_{t-2}$ and shifted two positions to the right, and the other is multiplied by w$_{t+2}$ and shifted two positions to the right.

The processing of a Temporal Aggregation Module (TAM) 200 in an example then sums the columns of the time shifted set of copies of input time sequences of sets of feature maps 206 to create a time sequence of a temporally aggregated sets of feature maps 208. In an example, the temporally aggregated sets of feature maps 208 is created by adding corresponding elements in each set of feature maps in the columns illustrated for the time shifted set of copies of input time sequences of sets of feature maps 206. In the above described examples, all of the sets of feature maps of the input time sequence of sets of feature maps 202, in the weighted input time sequence of sets of feature maps 204, in the time shifted set of copies of input time sequences of sets of feature maps 206 and in the time sequence of temporally aggregated sets of feature maps 208 have the same dimensions.

In an example, the processing of a Temporal Aggregation Module (TAM) 200 is able to be expressed as:

Each set of temporally of aggregated feature maps=ReLU $(\Sigma_{j=\lfloor R/2 \rfloor}^{j=\lfloor R/2 \rfloor} F_j \times W_j)$ Where F, W, R, and the "×" operator are defined above.

The temporally aggregated sets of feature maps 208 thus includes feature maps that incorporate temporal information regarding adjacent images and that are created by computationally efficient algorithms. Higher layers of a deep neural network are thus able to perform processing to characterize data based on such temporal information. Further, such higher layers of the deep neural network are also able to include additional Temporal Aggregation Modules (TAMs) and this increase the amount of temporal information that is able to be processed. The temporally aggregated sets of feature maps 208 in an example is then provided to a next neural network layer 210.

Figure 3:
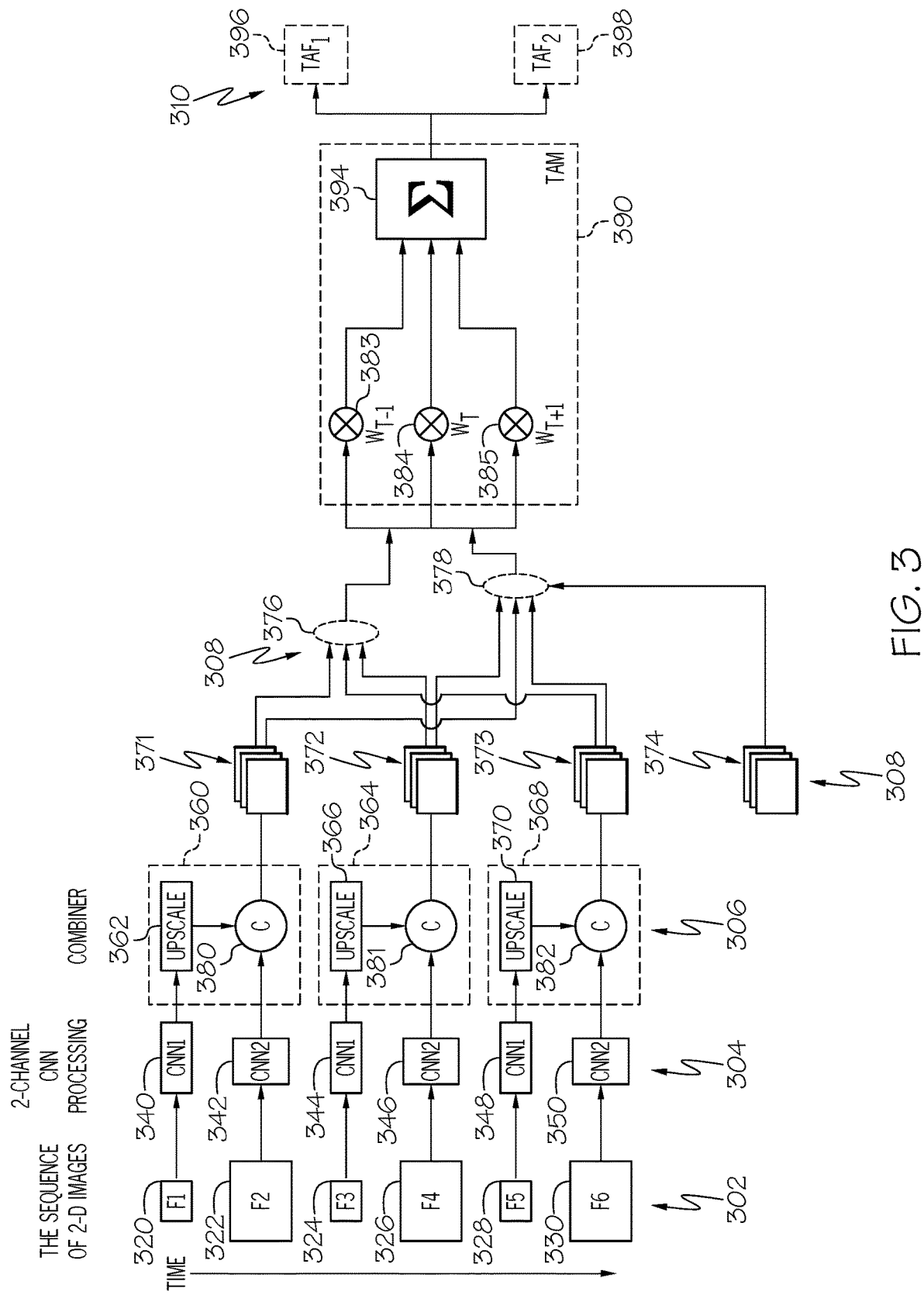
FIG. 3 illustrates an example multiple branch CNN machine learning processing flow with temporal aggregation, according to an example.

FIG. 3 illustrates an example multiple branch CNN machine learning processing flow with temporal aggregation 300, according to an example. The multiple branch CNN machine learning processing flow with temporal aggregation 300 is an example of an implementation of the above described first layer 104 or the above described second layer 106. As discussed above, received time sequences of video images 302 are derived from a video stream that has been processed so as to reduce the resolution of some of the two-dimensional images so as to facilitate their processing by more complex Convolutional Neural Networks (CNN) in a multiple branch Convolution Neural Network. The illustrated example multiple branch CNN machine learning processing flow with temporal aggregation 300 includes two configurations of Convolutional Neural Networks (CNNs), a higher complexity CNN that is used to process lower resolution images and a lower complexity CNN that is used to process higher resolution images. In an example, the higher complexity CNN has more nodes that the lower complexity CNN.

The example multiple branch CNN machine learning processing flow with temporal aggregation 300 depicts an example of the processing of a time sequence of two-dimensional images 302. The time sequence of two-dimensional images 302 is an example of a video stream that has been processed to alter the resolution of some images in order to be processed by a multiple channel Convolutional Neural Network (CNN) or other deep neural networks to identify temporal characteristics such as motion to support video understanding processing such as action recognition.

The illustrated time sequence of two-dimensional images 302 depict that these images alternate between high resolution images and low resolution images. In this example, a first image F1 320, a third image F3 324, and a fifth image F5 328 are low resolution images. A second image F2 322, a fourth image F4 326, and a sixth image F6 330 are higher resolution images. In an example, the time sequence of two-dimensional images 302 is created from a video stream where all images have the same resolution and alternate images are processed to reduce the resolution of those images. In an example, suitable processing of odd numbered frames of a video stream where all images have the same resolution is able to be used to reduce the resolution of odd numbered frames in order to produce the first image F1 320, the third image F3 324, and the fifth image F5 328.

The example multiple branch CNN machine learning processing flow with temporal aggregation 300 includes a multiple branch CNN processing component 304. The two-branch CNN processing component includes two types of convolutional Neural Networks (CNNs) that are indicated as CNN1 and CNN2. In the illustrated example, the first image F1 320 is processed by a first iteration of CNN1 340, the third image F3 324 is processed by a second iteration of CNN1 344, and the fifth image F5 328 is processed by a third iteration of CNN1 350. The second image F2 322 is processed by a first iteration of CNN2 342, a fourth image F4 326 is processed by a second iteration of CNN2 346, and the sixth image F6 330 is processed by a third iteration of CNN2 350.

In some examples, the iterations of CNN1, including the first iteration of CNN1 340, the second iteration of CNN1

344 and the third iteration of CNN1 348, are a single instance of CNN1 that serially processes the first image F1 320, the third image F3 324, and the fifth image F5 328. In further examples, any combination of instances of CNN1 is able to be used to process the multiple lower resolution images in the time sequence of two-dimensional images 302. Similarly, the various iterations of CNN2 are able to be one instance that serially processes high resolution images or any combination of instances.

The iterations of CNN1 and CNN2 each produce sets of feature maps where each set of feature maps is associated with each image being processed. As is known to practitioners of ordinary skill in the relevant arts, Convolutional Neural Networks (CNNs) that process two-dimensional images are able to be designed to produce one or more feature maps for each image. Those one or more feature maps are each two-dimensional maps in an example that are each associated with a kernel that is convolved over that image. In general, any number of feature maps is able to be generated by a Convolutional Neural Network. In some examples, a Convolutional Neural Network that processes two-dimensional images generates two-dimensional feature maps that have dimensions that are proportional to the number of pixels in the processed two-dimensional images. Because the iterations of CNN1 and CNN2 process images of different resolutions and thus different number of pixels, the two-dimensional feature maps generated by the iterations of CNN1 will have different dimensions than the two-dimensional feature maps generated by the iterations of CNN2.

The example multiple branch CNN machine learning processing flow with temporal aggregation 300 includes combiners 306 that operates to combine different size sets of feature maps that are generated by iterations of CNN1 and CNN2 to produce combined sets of feature maps. The example multiple branch CNN machine learning processing flow with temporal aggregation 300 includes a first combiner 360, a second combiner 364 and a third combiner 368. Each combiner in this example operates to "upscale" the two-dimensional feature maps produced by the iterations of CNN1, which process lower resolution images and produces feature maps with corresponding dimensions, so as to have the same or corresponding dimensions as feature maps produced by iterations of CNN2, which process higher resolution images and thus produces feature maps with larger dimensions. In various examples, combiners 306 are able to include any suitable processing to modify the dimensions of the two-dimensional feature maps generated by either or both of CNN1 or CNN2 to be equal in order to create combined sets of feature maps.

The first combiner 360 in the illustrated example includes a first upscaler 362 that converts the feature maps received from the first CNN1 340, which have smaller dimensions than feature maps produced by the first CNN2 342, to feature maps that have corresponding dimension as the feature maps produced by the first CNN2 342. In some examples, the first upscaler 342 increases the dimensions of feature maps by any suitable technique. In an example the first upscaler 342 increases dimensions of the feature maps by creating new values that are inserted between the existing values of the received feature maps. Those new values are determined based on interpolation of values between the existing values that are present in the received feature maps. In further examples, combiners are able to include a downsampler to reduce the resolution of higher resolution feature maps in order to produce sets of feature maps that correspond to feature maps produced by processing lower resolution images or produced by more complex Convolutional Neural Networks.

The up-scaled feature maps produced by the first upscaler 362 are provided to a first combining node 380. The first combining node 380 combines the up-scaled feature maps received from the first combiner 360 with feature maps produced by the first CNN2 342 to produce a first combined set of feature maps 371. In some examples, the first combining node 380 combines these feature maps by any suitable technique. In an example, the values in the feature maps are added to produce a new feature map. In another example, the values of the two received feature maps are averaged or combined according to a suitable algorithm. The first combining node 380 produces the first combined set of feature maps 371 in an example.

The second combiner 364 includes a second upscaler 366 that receives feature maps from the second CNN1 344 and upscales them for combining with the feature maps from the second CNN2 346 by the second combining node 381. The second combining node 381 produces a second combined set of feature maps 372. The third combiner 368 includes a third upscaler 370 that receives feature maps from the third CNN1 348 and upscales them for combining with the feature maps from the third CNN2 350 by the third combining node 382. The third combining node 382 produces a third combined set of feature maps 373. The operations of the second combiner 364 and the third combiner 368 are similar to the above described operations of the first combiner 360.

The combiners 306 produce a time sequence of combined sets of feature maps 308, which include the first combined sets of feature maps 371, second combined sets of feature maps 372, and the third combined sets of feature maps 373, discussed above, along with a fourth combined sets of feature maps 374 and a number of additional combined sets of feature maps (not shown), that are sequentially provided to a Temporal Aggregation Module (TAM) 390. In various examples, the Temporal Aggregation Module (TAM) 390 produces sets of temporally aggregated sets of feature maps 310. In an example the Temporal Aggregation Module (TAM) 390 produces each temporally aggregated set of feature maps 310 by processing a number of combined sets of feature maps. In the illustrated example, a first temporally aggregated sets of feature maps 396 are produced based on processing a first set of three combined sets of feature maps 376. The first set of three combined sets of feature maps 376 includes the first combined sets of feature maps 371, the second combined sets of feature maps 372, and the third combined sets of feature maps 373. A second temporally aggregated set of feature maps 398 is produced based on processing a second set of three combined sets of feature maps 378. The second set of three combined sets of feature maps 378 includes the second combined sets of feature maps 372, and the third combined sets of feature maps 373, which are also included in the first set of three combined sets of feature maps 376, and also includes the fourth combined sets of feature maps 374. The forth combined sets of feature maps 374 in an example is produced by fourth combiner (not shown) that processes feature maps derived from video frames that follow the sixth image F6 330.

The Time Acquisition Module (TAM) 390 in an example implements processing as is described above in the Temporal Aggregation Module (TAM) 200. In summary, the Temporal Aggregation Module (TAM) 390 receives a set of three combined sets of feature maps, creates weighted and time shifted copies of each of the received combined sets of feature maps, and sums these weighted copies to create a temporally aggregated set of feature maps.

The Temporal Aggregation Module 390 produces the first set of temporally aggregated sets of feature maps 396 by aggregating weighted values of the three (3) combined sets of feature maps that are produced by the combiner 306 based on processing of the six (6) images of the time sequence of two-dimensional images 302. In this illustrated example, the first set of temporally aggregated sets of feature maps 396 are associated with the second combined set of feature maps 372 produced by the second combiner node 381, which includes information that was produced by processing the third image F3 324 and the forth image F4 326. The Temporal Aggregation Module 390 produces the first temporally aggregated sets of feature maps 396 by aggregating information from the combined sets of feature maps that are associated with images that temporally precede and that temporally follow the second combined set of feature maps 372 produced by the second combiner node 381. Aggregating feature map information that is derived from temporally neighboring images as is performed by Temporal Aggregation Module (TAM) 390 efficiently allows higher layers of a deep neural network to characterize time varying characteristics in the received time sequences of video images 302, such as characterizing optical flows.

The Temporal Aggregation Module 390 includes a first weight multiplier 383 that multiplies values of the first combined set of feature maps within each combined sets of feature maps in the time sequence of combined sets of feature maps 308 by weights $w_{t-1}$. As discussed above, weights $w_{t-1}$ are weights that are applied to a set of feature maps that precede a central feature map when combining feature maps. The first weight multiplier 383 in an example multiplies values in the first combined set of feature maps within each combined sets of feature maps in the time sequence of combined sets of feature maps 308 by a 1×1×N vector through channel-wise multiplication as is described above.

The Temporal Aggregation Module 390 also includes a second weight multiplier 384 that multiplies values of the second combined set of feature maps within each combined sets of feature maps in the time sequence of combined sets of feature maps 308 by weights $w_t$. As discussed above, weights $w_t$ are weights that are applied to the central feature map when combining feature maps.

The Temporal Aggregation Module 390 includes a third weight multiplier 385 that multiplies values of the third combined set of feature maps within each combined sets of feature maps in the time sequence of combined sets of feature maps 308 by weights $w_{t+1}$. As discussed above, weights $w_{t+1}$ are weights that are applied to a set of feature maps that follow a central feature map when combining feature maps. The second weight multiplier 384 and the third weight multiplier 385 in an example multiply values in the respective combined set of feature maps by a 1×1×N vector through channel-wise multiplication as is described above.

The weighted combined sets of feature maps produced by the weight multipliers in the Temporal Aggregation Module 390 are summed by a summer 394. The summer 394 in an example performs an element by element addition of each element in each weighted combined sets of feature maps in order to produce a temporally aggregated sets of feature maps, such as the first temporally aggregated set of feature maps TAF₁ 396 and the second temporally aggregated set of feature maps TAF2 398, which all have the same dimension as the set of feature maps that are produced by the combiners 306.

The second temporally aggregated set of feature maps TAF2 398 is produced by the Temporal Aggregation Module (TAM) 390 in a manner that is similar to the production of the first temporally aggregated set of feature maps TAF1 396. The second temporally aggregated set of feature maps TAF2 398 is produced by aggregating feature maps that neighbor the third combined set of feature maps 373 that are produced by the third combiner node 382. The Temporal Aggregation Module 390 applies weights to and sums the second combined set of feature maps 372, the third combined set of feature maps 373, and a subsequent combined set of feature maps 374 that is produced by processing images (not shown) in the received time sequences of video images 302 that follow the sixth image F6 330. In an example, the Temporal Aggregation Module (TAM) applies the same weights $w_t$ for the production of all temporally aggregated sets of feature maps TAFs 310.

In general, each first aggregated sets of feature maps in the temporally aggregated sets of feature maps 310 have the same dimension as the combined sets of feature maps produced by the combiners 306. In general, one temporally aggregated set of feature maps TAF is produced that corresponds to each image, or pairs of images, in the sequence of 2-D images 302.

Referring to the example video understanding system 100 described above, each of the first layer 104 and the second layer 106 in an example each include at least one iteration of the multiple branch CNN processing component 304, the combiner 306 and the Temporal Aggregation Modules 390. In an example where the multiple branch CNN machine learning processing flow with temporal aggregation 300 includes components of the second layer 106, the temporally aggregated sets of feature maps, including the first temporally aggregated set of feature maps TAF₁ 396 and the second temporally aggregated set of feature maps TAF₂ 398, are provided as the first set of time aggregated feature maps 132 to the second layer 106. In one such example, the second layer 106 is an example of a higher layer neural network relative to the first layer 104.

The second layer 106, as an example of a higher layer neural network, is able to include at least two components that process the time sequence of temporally aggregated sets of feature maps 136, including the first temporally aggregated set of feature maps TAF₁ 396 and the second temporally aggregated set of feature maps TAF₂ 398. These two components of the higher level neural network in an example include a third convolutional neural network that operates on feature maps with a first dimension, such as at least one iteration of the CNN1 340, and a fourth convolutional neural network that operates on feature maps with a second dimension that is smaller than the first dimension, such as at least one iteration of CNN2 342. In an example, the fourth convolutional neural network has lower neural network complexity than the third convolutional neural network. In an example, processing of the time sequence of temporally aggregated sets of feature maps by the fourth convolutional neural network includes prior to producing outputs of video understanding processing, a down sampler that is configured to down-sample the time sequence of temporally aggregated sets of feature maps from the second dimension to be the first dimension.

Figure 4:
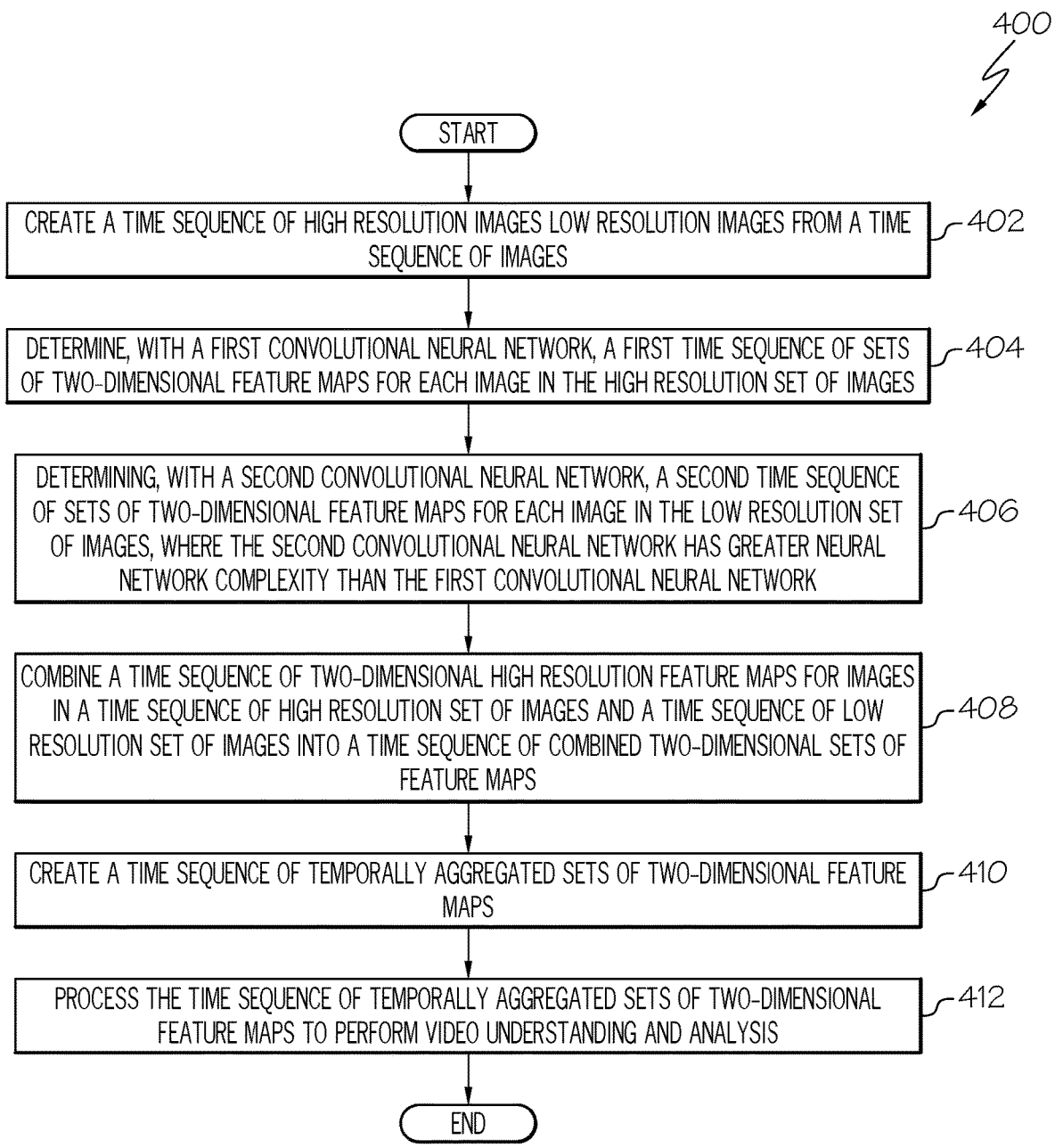
FIG. 4 illustrates an example multiple branch CNN machine learning processor with temporal aggregation processing flow.

FIG. 4 illustrates an example multiple branch CNN machine learning processor with temporal aggregation processing flow 400. The example multiple branch CNN machine learning processor with temporal aggregation processing flow 400 is an example of processing performed by the example video understanding system 100 discussed above.

The example multiple branch CNN machine learning processor with temporal aggregation processing flow 400 creates, at 402, a time sequence of high resolution images and low resolution images from a time sequence of images, such as the time sequence of images 102 discussed above. In some examples, the time sequence of images is received via an interface to the example multiple branch CNN machine learning processor with temporal aggregation that is performing the present processing flow. In some examples, creating the high resolution set of images and the low resolution set of images includes dividing the received time sequence of images 102 into those two sets.

In some examples, the low resolution images are created by processed some of the images in the time sequence of images to lower the resolution of those images. In some examples, the high resolution images are created by leaving other images in the time sequence of images 102 unaltered, by processing those other images to lower their resolution to a level greater than the low resolution images, by increasing the resolution of those images, or by combinations of these. Resolution of images is able to be modified by increasing or lowering the number of pixels in an image by any suitable technique. In some examples, resolution of an image is able to be increased by interpolating values of new pixels between existing pixels in the image, copying pixels and filtering the images, by any other suitable technique, or any combination of these. The resolution of images is also able to be reduced by any suitable technique, including removing pixels, averaging pixel values in an existing image and replacing those pixels with that average value, any other suitable technique, or combinations of these. In the present discussion, it is noted that the term resolution is to be broadly understood to refer aspects of an image that include, but are not limited to, the number of pixels in any dimension of an image, the total number of pixels, the number of pixels per unit length in an image, any other suitable aspect of an image, or combinations of these.

The example multiple branch CNN machine learning processor with temporal aggregation processing flow 400 determines, with a first convolutional neural network, at 404, a first time sequence of sets of feature maps for each image in the high resolution set of images. A second time sequence of sets of feature maps for each image in the low resolution set of images is also determined, at 406, with a second convolutional neural network. Determining feature maps of images using convolutional neural networks (CNNs) is understood by practitioners of ordinary skill in the relevant arts. With reference to the system described above with regards to the multiple branch CNN machine learning processing flow with temporal aggregation 300, Convolutional Neural Networks (CNNs) that process high resolution images are less complex than Convolutional Neural Networks (CNN) that process low resolution images. Because there are fewer pixels to process in a low resolution image to process, a more complex Convolutional Neural Network is able to be used to perform more complex processing of those images to identify aspects of interest. Using less complex Convolutional Neural Network to process higher resolution images allows processing that identifies features present in those higher resolution images.

A time sequence of high resolution feature maps for images in a time sequence of high resolution set of images and a time sequence of low resolution set of images are combined, at 408, into a time sequence of combined sets of feature maps. Combination of such feature maps is described above with regards to combiners 306.

A time sequence of temporally aggregated sets of feature maps is created, at 410. An example of creating such a temporal aggregation is described above with regards to the processing of a Temporal Aggregation Module (TAM) 200 and Temporal Aggregation Modules (TAMs) 390.

The time sequence of temporally aggregated sets of feature maps is processed, at 412, to perform video understanding processing tasks, such as action recognition. Processing of time sequence of temporally aggregated sets of feature maps is able to be performed by any suitable technique. In an example, such processing is able to be performed by higher levels of a Deep Neural Networks. The example multiple branch CNN machine learning processor with temporal aggregation processing flow 400 then ends.

Figure 5:
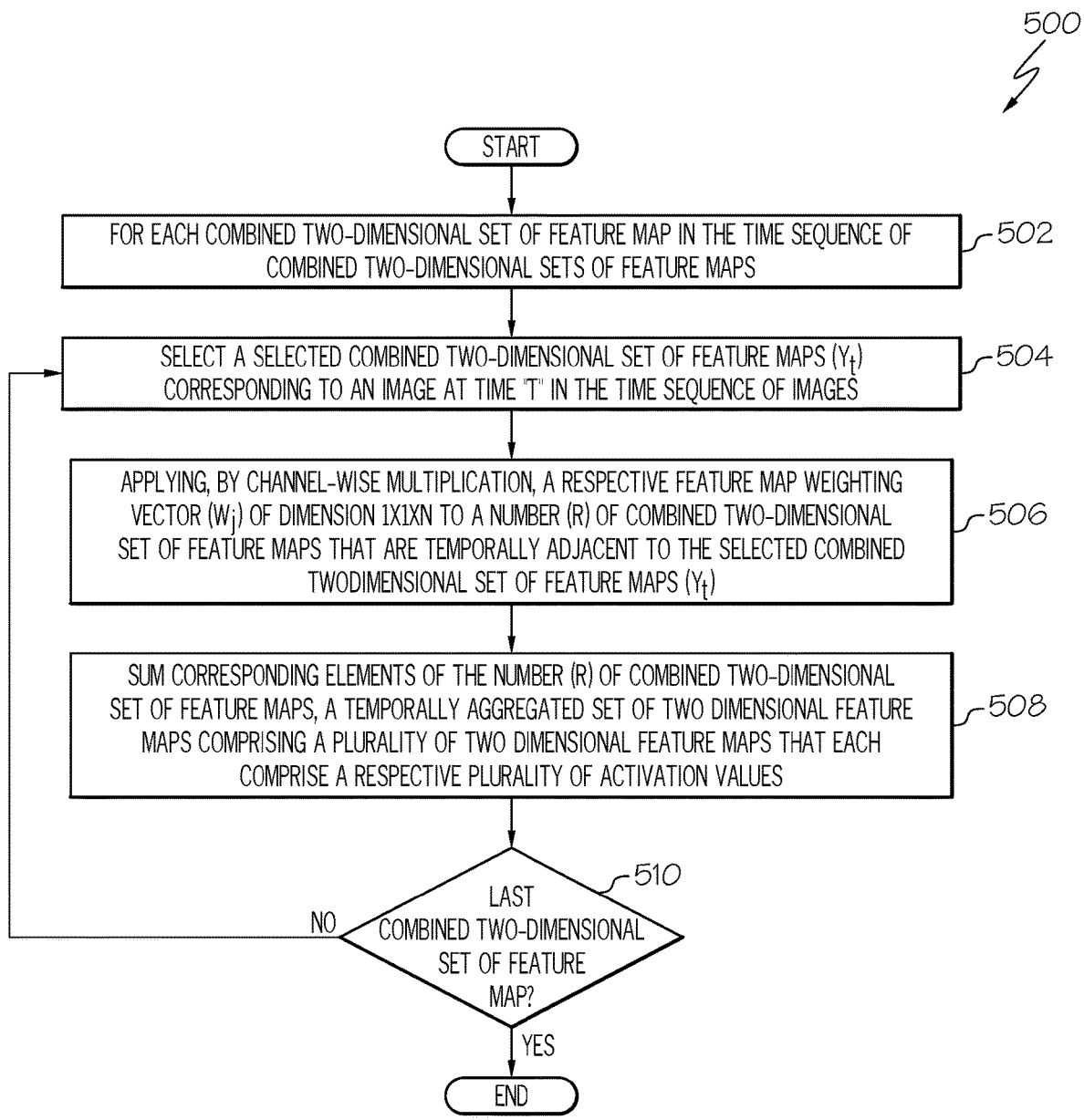
FIG. 5 illustrates an example Temporal Aggregation Module (TAM) processing flow.

FIG. 5 illustrates an example Temporal Aggregation Module (TAM) processing flow 500. The example Temporal Aggregation Module (TAM) processing flow 500 is an example of a process to perform the processing of a Temporal Aggregation Module (TAM) 200 and the processing performed by the Temporal Aggregation Modules (TAMs) 390, including each of the Temporal Aggregation Module 390 and the second Temporal Aggregation Module 392.

The example Temporal Aggregation Module (TAM) processing flow 500 performs a number of processes on each combined set of feature map in the time sequence of combined sets of feature maps. The processes performed by an example of a Temporal Aggregation Module are described below.

The example Temporal Aggregation Module processing flow 500 selects, at 502, a selected combined set of feature maps $(y_t)$ corresponding to an image at time "t" in the time sequence of images. The example Temporal Aggregation Module processing flow 500 applies, at 504, by channel-wise multiplication, a respective feature map weighting vector $(w_j)$ of dimension 1×1×N to a number (R) of combined set of feature maps that are temporally adjacent to the selected combined set of feature maps $(y_t)$. The example Temporal Aggregation Module processing flow 500 sums, at 506, corresponding elements of the number (R) of combined set of feature maps to create a temporally aggregated set of feature maps comprising a plurality of feature maps that each comprise a respective plurality of values.

A determination is made, at 510, as to whether the selected combined set of feature maps is the last combined set of feature map to be processed. If the selected combined set of feature maps is determined to not the last combined set of feature map to be processed, the example Temporal Aggregation Module (TAM) processing flow 500 returns to applying, at 504, a respective feature map weighting vector. If it is determined that the selected combined set of feature map is the last to be processed, the example Temporal Aggregation Module (TAM) processing flow 500 ends.

Figure 6:
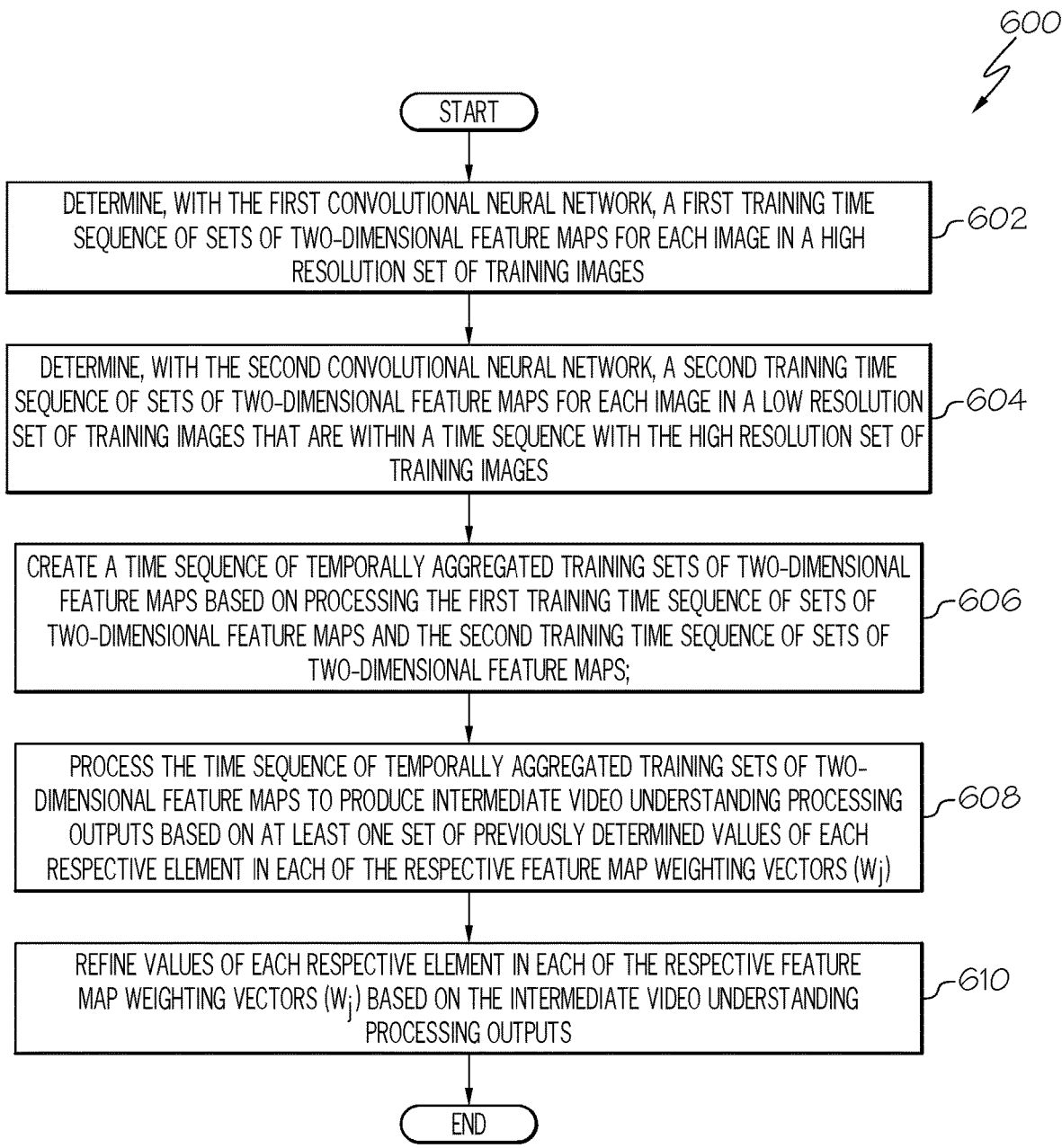
FIG. 6 illustrates an example Temporal Aggregation Module (TAM) training processing flow.

FIG. 6 illustrates an example Temporal Aggregation Module (TAM) training processing flow 600. The example Temporal Aggregation Module (TAM) training processing flow 600 is an example of iterative processing performed by the above described training controller 150 that is used to determine and iteratively refine values of each element of feature map weighting vectors $(w_j)$ that are used as weighting values to create the weighted input time sequence of sets of feature maps 204 and by the above weight multipliers that are contained in the Temporal Aggregation Modules (TAMs) 390. Examples of descriptions of the use of weighting vectors $(w_j)$ by a Temporal Aggregation Module are discussed above with regards to the example Temporal Aggregation Module (TAM) processing flow 500. In an example, the values within the weighting vectors ($w_j$) are refined by the training controller 150 by an iterative processing of a time-sequence of training images that includes a subset of high resolution training images and a subset of low resolution training images by performing an iterative process as is discussed below.

With reference to the example video understanding system 100 described above, a training controller 150 in an example performs the example Temporal Aggregation Module (TAM) training processing flow 600. In general, the training controller 150 performs processing to process training images to determine and refine parameters of the Convolutional Neural Networks that are included in the example video understanding system 100 as well as the values in the weighting vectors ($w_j$).

The example Temporal Aggregation Module (TAM) training processing flow 600 determines, at 602, with a first convolutional neural network, a first training time sequence of sets of feature maps for each image in a high resolution set of training images. A second training time sequence of sets of feature maps is determined, at 604, with a second convolutional neural network, for each image in a low resolution set of training images that are within a time sequence with the high resolution set of training images. In various examples, training images are able to be any suitable set of images that form a time sequence of images that allow efficient and accurate training of the weighting vectors ($w_j$). The example Temporal Aggregation Module (TAM) training processing flow 600 is an example of determining weighting values to be used by machine learning networks, which is generally referred to as training the machine learning network.

The example Temporal Aggregation Module (TAM) training processing flow 600 creates, at 606, a time sequence of temporally aggregated training sets of feature maps based on processing the first training time sequence of sets of feature maps and the second training time sequence of sets of feature maps. This is generally similar to the above described processing with regards to the creating, at 410.

The example Temporal Aggregation Module (TAM) training processing flow 600 processes, at 608, the time sequence of temporally aggregated training sets of feature maps to produce intermediate video understanding processing tasks outputs, such as action recognition outputs, based on processing of at least one set of previously determined values of each respective element in each of the respective feature map weighting vectors ($w_j$). This processing is similar to the processing described above at combining 408, creating 410, and processing 412.

The example Temporal Aggregation Module (TAM) training processing flow 600 refines, at 610, values of each respective element in each of the respective feature map weighting vectors ($w_j$) based on the above produced intermediate video understanding processing outputs. In an example, the sets of training images have optical flows, such as motions of objects within the time sequence of images, with known characteristics that correspond to video understanding processing outputs. Such known characteristics are able to be obtained for training sets by any suitable techniques as are known to practitioners of ordinary skill in the relevant arts. In an example, values of each respective element in each of the respective feature map weighting vectors ($w_j$) are refined by performing multiple iterations of the example Temporal Aggregation Module (TAM) training processing flow 600 and reducing differences between those known characteristics for the sets of training images and the video understanding processing outputs that are produced based on at least one set of previously determined values of each respective element in each of the respective feature map weighting vectors ($w_j$).

Information Processing System

Figure 7:
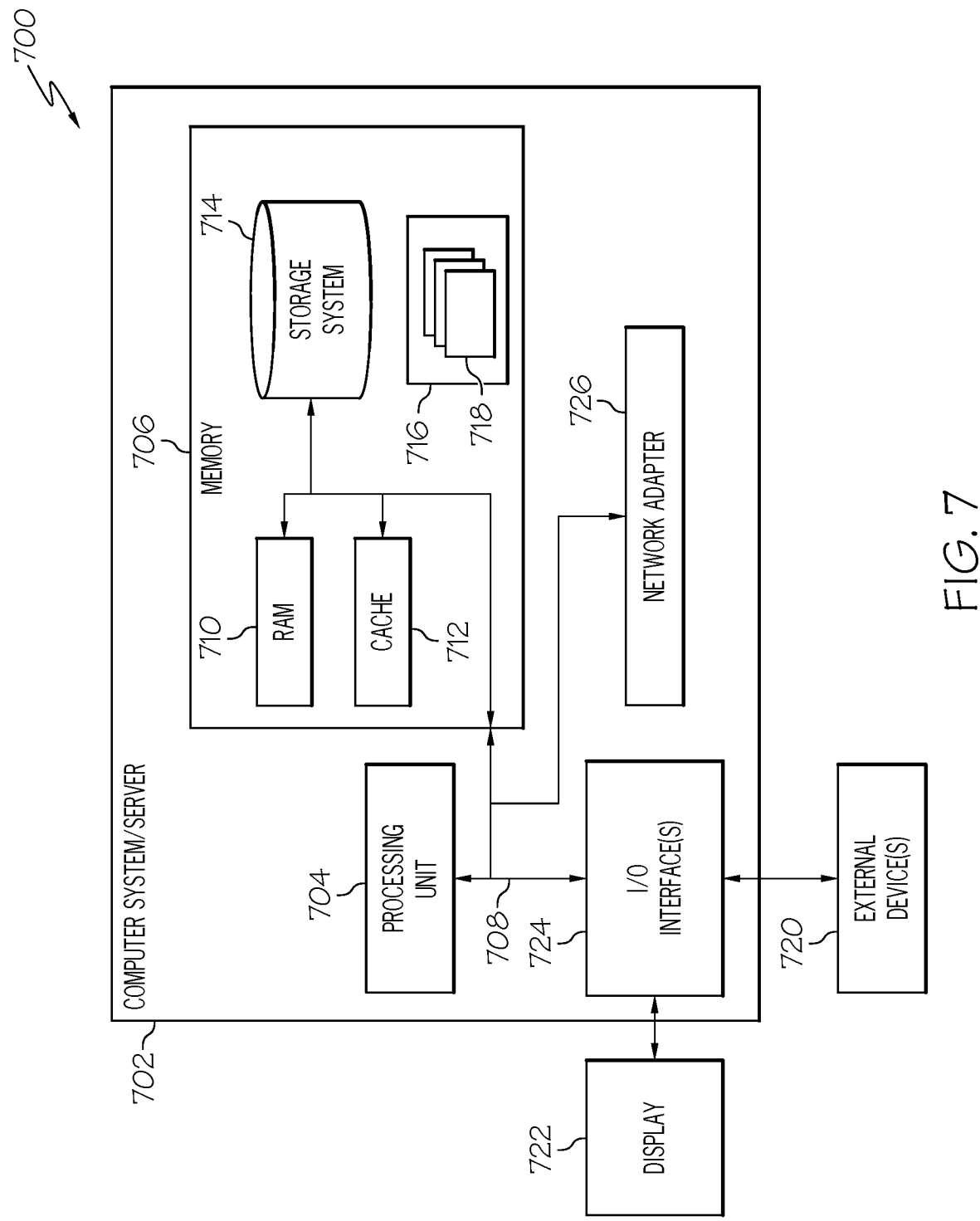
FIG. 7 is a block diagram illustrating one example of an information processing system according to one example.

Referring now to FIG. 7, this figure is a block diagram illustrating an information processing system that can be utilized in various examples of the present disclosure. The information processing system 702 is based upon a suitably configured processing system configured to implement one or more embodiments of the present disclosure. Any suitably configured processing system can be used as the information processing system 702 in embodiments of the present disclosure. In another embodiment, the information processing system 702 is a special purpose information processing system configured to perform one or more embodiments discussed above. The components of the information processing system 702 can include, but are not limited to, one or more processors or processing units 704, a system memory 706, and a bus 708 that couples various system components including the system memory 706 to the processor 704.

The bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 706 can also include computer system readable media in the form of volatile memory, such as random access memory (RAM) 710 and/or cache memory 712. The information processing system 702 can further include other removable/non-removable, volatile/non-volatile computer system storage media. By way of example only, a storage system 714 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 708 by one or more data media interfaces. The memory 706 can include at least one program product having a set of program modules that are configured to carry out the functions of various examples described above.

Program/utility 716, having a set of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of the above described processes and systems.

The information processing system 702 can also communicate with one or more external devices 720 such as a keyboard, a pointing device, a display 722, and the like. The information processing system 702 is further able to communicate with one or more devices that enable a user to interact with the information processing system 702; and/or any devices (e.g., network card, modem, etc.) that enable computer system/server 702 to communicate with one or more other computing devices. Such communication can occur via I/O interfaces 724. Still yet, the information processing system 702 can communicate with one or more networks such as a local area network (LAN), a general wide area network (WAN), and/or a public network (e.g., the Internet) via network adapter 726. As depicted, the network adapter 726 communicates with the other components of information processing system 702 via the bus 708. Other hardware and/or software components can also be used in conjunction with the information processing system 702. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for supporting video understanding processing of a time sequence of images, the method comprising:
    combining, into a time sequence of combined sets of feature maps, a respective set of high resolution feature maps for each respective image in a time sequence of high resolution set of images with a respective set of low resolution feature maps for respective corresponding images in a time sequence of low resolution set of images,
    wherein each combined sets of feature maps comprises N feature maps;
    creating a time sequence of temporally aggregated sets of feature maps, the creating comprising, for each combined set of feature maps in the time sequence of combined sets of feature maps:
        selecting a selected combined set of feature maps ($y_t$) corresponding to an image at time "t" in the time sequence of images;
        applying, by channel-wise multiplication, a respective feature map weighting vector ($w_j$) of dimension 1×1×N to a number (R) of combined set of feature maps that are temporally adjacent to the selected combined set of feature maps ($y_t$); and
        summing corresponding elements of the number (R) of combined set of feature maps into a temporally aggregated set of feature maps comprising a plurality of feature maps that each comprise a respective plurality of values; and
    processing the time sequence of temporally aggregated sets of feature maps to perform video understanding processing.

2. The method of claim 1, wherein:
    each feature map in the set of low resolution feature maps comprises fewer elements than each feature map in the set of high resolution feature maps, and
    wherein the combining comprises modifying respective dimensions of feature maps in at least one of the set of low resolution feature maps or the set of high resolution feature maps so as to result in all feature maps having corresponding dimensions.

3. The method of claim 1, further comprising processing, prior to performing the video understanding, the time sequence of temporally aggregated sets of feature maps by at least two components of a higher level neural network, where the two components of the higher level network comprises:
    a third convolutional neural network that operates on feature maps with a first dimension; and
    a fourth convolutional neural network that operates on feature maps with a second dimension that is larger than the first dimension, the fourth convolutional neural network comprising has lower neural network complexity than the third convolutional neural network.

4. The method of claim 3, wherein processing of the time sequence of temporally aggregated sets of feature maps by the fourth convolutional neural network comprises, prior to performing the video understanding, down-sampling the time sequence of temporally aggregated sets of feature maps from the second dimension to be the first dimension.

5. The method of claim 1, further comprising:
    receiving a time sequence of images that comprises the high resolution set of images and the low resolution set of images;
    dividing the time sequence of images into the high resolution set of images and the low resolution set of images;
    determining, with a first convolutional neural network, a first time sequence of sets of feature maps comprising the respective set of feature maps for each respective image in the high resolution set of images; and
    determining, with a second convolutional neural network, a second time sequence of sets of feature maps comprising the respective set of feature maps for each respective image in the low resolution set of images, where the second convolutional neural network has lower neural network complexity than the first convolutional neural network.

6. The method of claim 5, wherein the second convolutional neural network comprises more nodes than the first convolutional neural network.

7. The method of claim 5, wherein at least one of the first convolutional neural network or the second convolutional neural network comprises two-dimensional convolutional neural networks.

8. The method of claim 5, wherein at least one of the first convolutional neural network or the second convolutional neural network comprises three-dimensional convolutional neural networks.

9. The method of claim 5, further comprising iteratively refining values of each respective element in each of the respective feature map weighting vectors ($w_j$) based on iterative processing a time-sequence of training images that comprises a subset of high resolution training images and a subset of low resolution training images, where the iterative processing of the time-sequence of training images comprises:
    determining, with the first convolutional neural network, a first training time sequence of sets of feature maps comprising respective sets of feature maps for each respective image in the subset of high resolution training images;

determining, with the second convolutional neural network, a second training time sequence of sets of feature maps comprising respective sets of feature maps for each respective image in the subset of low resolution training images; and creating a time sequence of temporally aggregated training sets of feature maps based on processing the first training time sequence of sets of feature maps and the second training time sequence of sets of feature maps;

processing the time sequence of temporally aggregated training sets of feature maps to produce intermediate video understanding processing outputs based on at least one set of previously determined values of each respective element in each of the respective feature map weighting vectors ($w_j$); and refining values of each respective element in each of the respective feature map weighting vectors ($w_j$) based on the intermediate video understanding processing outputs.

10. An apparatus for supporting video understanding processing of a time sequence of images, the apparatus comprising:

a processor;

a memory coupled to the processor;

a combiner, when operating, is configured to combine, into a time sequence of combined sets of feature maps, a respective set of high resolution feature maps for each respective image in a time sequence of high resolution set of images with a respective set of low resolution feature maps for respective corresponding images in a time sequence of low resolution set of images, wherein each combined sets of feature maps comprises N feature maps;

a Temporal Aggregation Module, when operating, is configured to create a time sequence of temporally aggregated sets of feature maps, the Temporal Aggregation Module creates by at least, for each combined set of feature maps in the time sequence of combined sets of feature maps:

selecting a selected combined set of feature maps ($y_t$) corresponding to an image at time "t" in the time sequence of images;

applying, by channel-wise multiplication, a respective feature map weighting vector ($w_j$) of dimension 1×1×N to a number (R) of combined set of feature maps that are temporally adjacent to the selected combined set of feature maps ($y_t$); and summing corresponding elements of the number (R) of combined set of feature maps into a temporally aggregated set of feature maps comprising a plurality of feature maps that each comprise a respective plurality of values; and a video understanding module configured to process the time sequence of temporally aggregated sets of feature maps to perform video understanding processing.

11. The apparatus of claim 10, wherein:

each feature map in the set of low resolution feature maps comprises fewer elements than each feature map in the set of high resolution feature maps, and wherein the combining comprises modifying respective dimensions of feature maps in at least one of the set of low resolution feature maps or the set of high resolution feature maps so as to result in all feature maps having corresponding dimensions.

12. The apparatus of claim 10, further comprising a higher level neural network configured to process, prior to performing the video understanding, the time sequence of temporally aggregated sets of feature maps by at least two components, where the two components of the higher level neural network comprise:

a third convolutional neural network that operates on feature maps with a first dimension; and a fourth convolutional neural network that operates on feature maps with a second dimension that is larger than the first dimension, the fourth convolutional neural network comprising has lower neural network complexity than the third convolutional neural network.

13. The apparatus of claim 12, further comprising a down-sampler configured to down-sample the time sequence of temporally aggregated sets of feature maps from the second dimension to be the first dimension after processing of the time sequence of temporally aggregated sets of feature maps by the fourth convolutional neural network.

14. The apparatus of claim 10, further comprising a neural network layer, the neural network layer, when operating:

receives a time sequence of images that comprises the high resolution set of images and the low resolution set of images;

divides the time sequence of images into the high resolution set of images and the low resolution set of images;

determines, with a first convolutional neural network, a first time sequence of sets of feature maps comprising the respective set of feature maps for each respective image in the high resolution set of images; and determines, with a second convolutional neural network, a second time sequence of sets of feature maps comprising the respective set of feature maps for each respective image in the low resolution set of images, where the second convolutional neural network has lower neural network complexity than the first convolutional neural network.

15. The apparatus of claim 14, wherein at least one of the first convolutional neural network or the second convolutional neural network comprises two-dimensional convolutional neural networks.

16. The apparatus of claim 14, wherein the second convolutional neural network comprises more nodes than the first convolutional neural network.

17. The apparatus of claim 14, further comprising a training controller that, when operating, is configured to iteratively refine values of each respective element in each of the respective feature map weighting vectors ($w_j$) based on iterative processing a time-sequence of training images that comprises a subset of high resolution training images and a subset of low resolution training images, where the training controller, in performing the iterative processing of the time-sequence of training images:

determines, with the first convolutional neural network, a first training time sequence of sets of feature maps comprising respective sets of feature maps for each respective image in the subset of high resolution training images;

determines, with the second convolutional neural network, a second training time sequence of sets of feature maps comprising respective sets of feature maps for each respective image in the subset of low resolution training images; and creates a time sequence of temporally aggregated training sets of feature maps based on processing the first training time sequence of sets of feature maps and the second training time sequence of sets of feature maps;
processes the time sequence of temporally aggregated training sets of feature maps to perform intermediate video understanding processing outputs based on at least one set of previously determined values of each respective element in each of the respective feature map weighting vectors ($w_j$); and
refines values of each respective element in each of the respective feature map weighting vectors ($w_j$) based on the intermediate video understanding processing outputs.

18. A computer program product for supporting video understanding processing of a time sequence of images the computer program product comprising:
a storage medium readable by a processing circuit and storing instructions for execution by the processing circuit for performing a method comprising:
combining, into a time sequence of combined sets of feature maps, a respective set of high resolution feature maps for each respective image in a time sequence of high resolution set of images with a respective set of low resolution feature maps for respective corresponding images in a time sequence of low resolution set of images,
wherein each combined sets of feature maps comprises N feature maps;
creating a time sequence of temporally aggregated sets of feature maps, the creating comprising, for each combined set of feature maps in the time sequence of combined sets of feature maps:
selecting a selected combined set of feature maps ($y_t$) corresponding to an image at time "t" in the time sequence of images;
applying, by channel-wise multiplication, a respective feature map weighting vector ($w_j$) of dimension 1×1×N to a number (R) of combined set of feature maps that are temporally adjacent to the selected combined set of feature maps ($y_t$); and
summing corresponding elements of the number (R) of combined set of feature maps into a temporally aggregated set of feature maps comprising a plurality of feature maps that each comprise a respective plurality of values; and
processing the time sequence of temporally aggregated sets of feature maps to perform video understanding.

19. The computer program product of claim 18, wherein the method further comprises:
receiving a time sequence of images that comprises the high resolution set of images and the low resolution set of images;
dividing the time sequence of images into the high resolution set of images and the low resolution set of images;
determining, with a first convolutional neural network, a first time sequence of sets of feature maps comprising the respective set of feature maps for each respective image in the high resolution set of images; and
determining, with a second convolutional neural network, a second time sequence of sets of feature maps comprising the respective set of feature maps for each respective image in the low resolution set of images, where the second convolutional neural network has lower neural network complexity than the first convolutional neural network.

20. The computer program product of claim 19, wherein the method further comprises iteratively refining values of each respective element in each of the respective feature map weighting vectors ($w_j$) based on iterative processing a time-sequence of training images that comprises a subset of high resolution training images and a subset of low resolution training images, where the iterative processing of the time-sequence of training images comprises:
determining, with the first convolutional neural network, a first training time sequence of sets of feature maps comprising respective sets of feature maps for each respective image in the subset of high resolution training images;
determining, with the second convolutional neural network, a second training time sequence of sets of feature maps comprising respective sets of feature maps for each respective image in the subset of low resolution training images; and
creating a time sequence of temporally aggregated training sets of feature maps based on processing the first training time sequence of sets of feature maps and the second training time sequence of sets of feature maps;
processing the time sequence of temporally aggregated training sets of feature maps to produce intermediate video understanding processing outputs based on at least one set of previously determined values of each respective element in each of the respective feature map weighting vectors ($w_j$); and
refining values of each respective element in each of the respective feature map weighting vectors ($w_j$) based on the intermediate video understanding processing outputs.

* * * * *